United States Patent Office 3,574,181
Patented Apr. 6, 1971

3,574,181
DISAZO DYES
Willy Forter, Allschwil, Basel-land, and Fritz Kehrer, Basel, Switzerland, assignors to Sandoz Ltd. (also known as Sandoz A.G.), Basel, Switzerland
No Drawing. Filed Jan. 18, 1968, Ser. No. 698,690
Int. Cl. C09b 33/02
U.S. Cl. 260—152      3 Claims

ABSTRACT OF THE DISCLOSURE

Disazo dyes having the formula

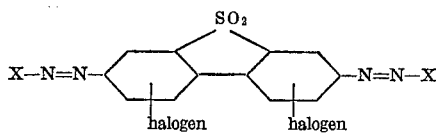

where the two X symbols stand for the radicals of identical or different coupling components which are free from water-solubilizing groups, are useful for the pigmentation or printing of natural and synthetic materials.

---

This invention relates to disazo dyes having the formula

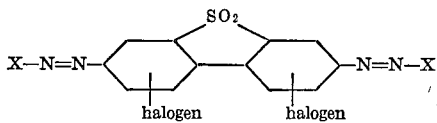

where the two X symbols stand for the radicals of identical or different coupling components which are free from water-solubilizing groups, and to their production and their use for the pigmentation or printing of natural and synthetic materials.

It has been found that disazo dyes of the formula

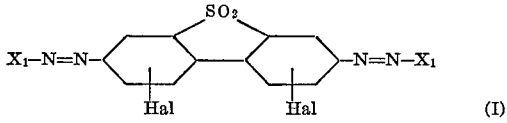

have very valuable properties. In this formula "Hal" stands for a chlorine or bromine atom and each of the two $X_1$ symbols, independently of each other, stands for a radical of one of the formulae

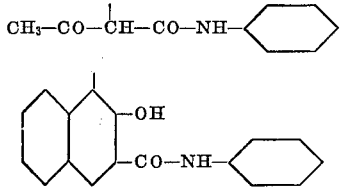

and

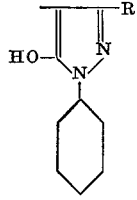

wherein R stands for a methyl, methoxycarbonyl, ethoxycarbonyl, aminocarbonyl, methylaminocarbonyl or phenylaminocarbonyl group, and in which the phenyl nuclei of the coupling compounds $X_1$—H may be substituted by fluorine, chlorine or bromine atoms, lower alkyl or alkoxy groups, nitro, cyano, trifluoromethyl, methylsulphonyl, aminocarbonyl, lower alkylaminocarbonyl, phenylaminocarbonyl, aminosulphonyl, lower alkylaminosulphonyl, phenylaminosulphonyl, lower alkoxycarbonyl, lower alkanoylamino and benzoylamino groups. The alkyl or alkoxy groups designated "lower" are those containing 1 to 4 or preferably 1 or 2 carbon atoms.

One route for the production of the diazo dyes of this invention is to react one mole of the tetrazo compound of 2,7-diamino-3,6-dichlorodiphenylsulphone (II) or of 2,7-diamino-3,6-dibromodiphenylsulphone (III) with two moles of a coupling component or a mixture of coupling components of the formla $X_1$—H. The diamines employed for tetrazotization have the formula

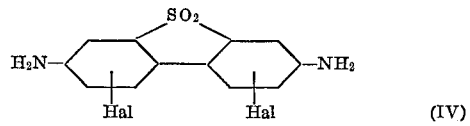

The compounds (II) and (III) can be produced by reacting a 4,4'-diamino-3,3'-dichloro-1,1'-diphenyl or 4,4'-diamino-3,3'-dibromo-1,1'-diphenyl with sulphur trioxide in sulphuric acid. They can be tetrazotized in the normal way, for example with sodium nitrite in hydrochloric acid suspension, or better still with nitrosylsulphuric acid as described e.g., in "Grundlegende Operationen der Farbenchemie" by Fierz-David and Blangey, 5th Impression (1943), pp. 249 and 236.

The coupling reaction can be carried out in a weakly acid, neutral or alkaline aqueous solution in the pH region of about 3.5 to 11.5. It is often of advantage to add pyridine. Coupling can also be effected in organic solvents alone, for example in pyridine or dioxan, or in mixtures of organic solvents.

It is desirable to convert the new dyes into pigment pastes by mechanical treatment, for example in ball or roller mills, and if necessary with dispersing agents, for example the condensation products of naphthalenesulphonic acids and formaldehyde. The pigment pastes can be employed as they are, or they can be dried and the resulting powders ground.

The new compounds are excellent pigments. They are virtually insoluble in the commonly used solvents. Their uses include the dyeing of paper in the stock, the pigmentation of plastics, rubber, natural and synthetic resins, and the printing of textiles and paper. In these materials the pigments show good transparency and heat stability, are outstandingly fast to light and have very good fastness to washing, chlorine, hypochlorite and peroxide bleaching- cross dyeing, blind vats, hydrosulphite, drycleaning, rubbing, migration, overlacquering and solvents.

In the following examples the parts and percentages are by weight and the temperatures in degrees centigrade.

EXAMPLE 1

31.5 parts of 2,7-diamino - 3,6 - dichlorodiphenylsulphone are entered at 0–5° into a nitrosylsulphuric acid prepared with 100 parts of concentrated sulphuric acid and 14 parts of sodium nitrite. After about 3 hours the solution is run onto 550 parts of ice, the slight excess of nitrite decomposed with amidosulphonic acid and the solution clarified by filtration. The pale yellow solution is then combined at 10–15° with a fine acetic acid suspension of 41.4 parts of 1-acetoacetylamino-2-methoxybenzene, the pH value being maintained between 3.5 and 4.5. On completion of the coupling reaction the mixture is raised to 90° and the product is filtered off and washed free from salt. The pigment obtained dyes polyvinyl chloride and greenish yellow shades which have good light and migration fastness.

The 2,7-diamino - 3,6 - dichlorodiphenylsulphone used in this example can be prepared by treating 127 parts of 4,4' - diamino - 3,3' - dichlorodiphenyl in 250 parts of 40% oleum for 2 hours at 80°. On cooling the mixture is run onto 3000 parts of ice and the product is filtered off and suspended in water, the suspension neutralized with sodium hydroxide solution and raised to 100°. The sulphone is filtered off hot and dried.

Further yellow pigments suitable among other uses for the mass pigmentation of polyvinyl chloride are obtained when in place of 1-acetoacetylamino - 2 - methoxybenzene and equimolecular amount of one or of a mixture of two or more of the coupling components named hereunder is used:

1-acetoacetylamino-2-ethoxybenzene,
1-aectoacetylamino-4-methoxybenzene,
1-acetoacetylamino-4-ethoxybenzene,
1-acetoacetylamino-2-methoxy-5-ethylbenzene,
1-acetoacetylamino-2,5-diethoxybenzene,
1-acetoacetylamino-2-methylbenzene,
1-acetoacetylamino-2,4-dimethylbenzene or
1-acetoacetylamino-benzene.

EXAMPLE 2

A solution of 54.3 parts of 1-acetoacetylamino-2,5-dimethoxy-4-chlorobenzene in 1000 parts of water and 22 parts of 30% sodium hydroxide solution is prepared and filtered for clarification. A mixture of 13 parts of glacial acetic acid and 100 parts of water is added to it with vigorous stirring, followed by a solution of 60 parts of carystallized sodium acetate in 100 parts of water. Subsequently a tetrazo solution, prepared as specified in Example 1, is added. The pH of the reaction mixture is held at 4.8 to 5.2 by adding 15% sodium hydroxide solution. The coupling temperature is 20°. When the reaction has run its course the mixture is raised to 90° and the product filtered off and washed.

0.1 part of the disazo dye thus formed is pasted with 0.2 part of a polyester plasticizer of high molecular weight, e.g. Paraplex 53 (registered trademark), and the paste ground in a milling machine. The paste is then mixed with 100 parts of plasticized polyvinyl chloride and this is processed on a roller mill with friction for 10 minutes at about 150–160° C., to form a film which is drawn off at synchronous roller speed or with slight friction. An orange film is obtained, the colour of which is fast to light and outstandingly resistant to migration. Equally good results are obtained when the 31.5 parts of 2,7 - diamino - 3,6 - dichlorodiphenylsulphone are replaced by 40.4 parts of 2,7 - diamino - 3,6 - dibromodiphenylsulphone or when 1-acetoacetylamino - 2,5 - dimethoxy - 4 - chlorobenzene is replaced by an equimolar amount of:

1-acetoacetylamino-4-chlorobenzene,
1-acetoacetylamino-2-methoxy-4-chlorobenzene,
1-acetoacetylamino-3-chloro-4-methylbenzene,
1-acetoacetylamino-2-methyl-3-chlorobenzene
1-acetoacetylamino-2-methyl-6-chlorobenzene,
1-acetoacetylamino-2,4-dimethoxy-5-chlorobenzene,
1-acetoacetylamino-2-methoxy-4-chloro-5-methylbenzene,
1-acetoacetylamino-2-methoxy-4,5-dichlorobenzene,
1-acetoacetylamino-2,5-dimethoxy-4-fluorobenzene,
1-acetoacetylamino-2,5-dimethoxy-4-cyanobenzene,
1-acetoacetylamino-2,5-dimethoxy-4-nitrobenzene,
1-acetoacetylamino-2-methoxy-4-acetylaminobenzene,
1-acetoacetylamino-2,4,5-trichlorobenzene,
1-acetoacetylamino-2,6-dibromo-4-nitrobenzene or
1-acetoacetylamino-2,5-dimethyl-3,6-dichlorobenzene.

EXAMPLE 3

Following the procedure of Example 1, 31.5 parts of 2,7-diamino 3,6-dichlorodiphenylsulphone are tetrazotized and the filtered, buffered tetrazo solution is combined with a solution of 41.4 parts of 1-acetoacetylamino-2-methoxybenzene in pyridine. After filtration and washing, to eliminate the salt, a greenish yellow pigment is obtained which is of high tinctorial strength and has excellent light and migration fastness.

One part of this pigment is ground with 1 part of tricresyl phosphate in a colour mill. One part of the ground pigment paste is mixed with 4 parts of Ethyl Cellulose N 14 (registered trademark) in a solvent mixture of 50 parts of methyl isobutylketone, 40 parts of ethyl acetate and 10 parts of n-butyl alcohol. This cellulose lacquer is thinned to spraying viscosity and sprayed on sheet aluminium or chromo board.

An equimolecular amount of any one of the following compounds can be used in place of 1-acetoacetylamino-2-methoxybenzene with equally good results:

1-acetoacetylamino-3-trifluoromethylbenzene,
1-acetoacetylamino-4-methylsulphonylbenzene,
1-acetoacetylamino-2-methoxy-5-trifluoromethylbenzene,
1-acetoacetylamino-2-chloro-5-trifluoromethylbenzene,
1-acetoacetylamino-3-trifluoromethyl-4-chlorobenzene,
1-acetoacetylamino-3,5-bis-(trifluoromethyl)-benzene,
1-acetoacetylamino-2,5-dimethoxy-4-methylsulphonylbenzene,
1-acetoacetylamino-4-benzoylaminobenzene,
1-acetoacetylamino-4-acetylaminobenzene,
1-acetoacetylamino-2,5-dimethoxy-4-benzoylaminobenzene,
1-acetoacetylamino-2,5-diethoxy-4-benzoylaminobenzene,
1-acetoacetylamino-2-methyl-4-acetylamino-5-methoxybenzene,
1-acetoacetylamino-2-methoxy-5-chloro-4-acetylaminobenzene,
1-acetoacetylaminobenzene-4-carboxylic acid amide,
1-acetoacetylaminobenzene-4-carboxylic acid methylester,
1-acetoacetylaminobenzene-4-carboxylic acid ethylester,
1-acetoacetylamino-2-methoxybenzene-5-carboxylic acid phenylamide,
1-acetoacetylamino-2,5-dimethoxybenzene-4-sulphonic acid amide,
1-acetoacetylamino-2,5-dimethoxybenzene-4-sulphonic acid phenylamide.

EXAMPLE 4

40.4 parts of 2,7diamino-3,6-dibromodiphenylsulphone are suspended in 400 parts of water and 55 parts of 30% hydrochloric acid. A 4 normal aqueous solution of 13.8 parts of sodium nitrite is added to effect diazotization at 0°. Subsequently the filtered tetrazo solution is united with a solution of 40.8 parts of 1-(4'-methoxy)-phenyl-3-methyl-5-pyrazolone in 2000 parts of water and 300 parts of 30% sodium hydroxide solution, to which 1000 parts of ice is aded to keep the temperature at 10°. On completion of the coupling reaction the mixture is rendered acid to Congo paper, raised to 80–90°, and the pigment is filtered off, washed free of salt and dried. It is of good tinctorial strength and gives red shades in polyvinyl chloride.

The following are listed as examples of pyrazolones which can be coupled in the same way:

1-phenyl-3-methyl-5-pyrazolone,
1-(3'-chloro)-phenyl-3-methyl-5-pyrazolone,
1-(3'-cyano)-phenyl-3-methyl-5-pyrazolone,
1-(2'-methyl)-phenyl-3-methyl-5-pyrazolone,
1-(2'-methoxy)-phenyl-3-methyl-5-pyrazolone,
1-(4'-methyl)-phenyl-3-methyl-5-pyrazolone,
1-phenyl-5-pyrazolone-3-carboxylic acid ethylester,
1-phenyl-5-pyrazolone-3-carboxylic acid methylester,
1-phenyl-5-pyrazolone-3-carboxylic acid amide,
1-phenyl-5-pyrazolone-3-carboxylic acid dimethylamide,
1-phenyl-5-pyrazolone-3-carboxylic acid ethylamide
1-phenyl-5-pyrazolone-3-carboxylic acid phenylamide.

EXAMPLE 5

31.5 parts of 2,7-diamino-3,6-dichlorodiphenylsulphone are tetrazotized as detailed in Example 1 and the tetrazo solution is filtered and combined at 10° with a solution of 71.5 parts of 2-hydroxynaphthalene-3-carboxylic acid-(2',4'-dimethoxy-5'-chloro)-phenylamide in 1000 parts of water, 500 parts of methyl alcohol and 50 parts of 30% sodium hydroxide solution. The pH is maintained at 11.8 by simultaneous dropwise addition of 600 parts of 30% sodium hydroxide solution. When coupling is complete the settled-out pigment is isolated and washed until of neutral reaction. It dyes paper in violet shades.

The following 2-hydroxynaphthalene-3-carboxylic acid amides are examples of other such compounds which can be coupled on analogous lines:

2-hydroxynaphthalene-3-carboxylic acid phenylamide,
2-hydroxynaphthalene-3-carboxylic acid-(2'-methoxy)-phenylamide,
2-hydroxynaphthalene-3-carboxylic acid-(2',5'-dimethoxy)-phenylamide,
2-hydroxynaphthalene-3-carboxylic acid-(3'-nitro)-phenylamide,
2-hydroxynaphthalene-3-carboxylic acid-(4'-nitro)-phenylamide,
2-hydroxynaphthalene-3-carboxylic acid-(2',4'-dimethyl)-phenylamide,
2-hydroxynaphthalene-3-carboxylic acid-(2'-methyl)-phenylamide,
2-hydroxynaphthalene-3-carboxylic acid-(4'-chloro)-phenylamide,
2-hydroxynaphthalene-3-carboxylic acid-(2',5'-dimethoxy-4'-chloro)-phenylamide,
2-hydroxynaphthalene-3-carboxylic acid-(2'-methyl-4'-methoxy)-phenylamide,
2-hydroxynaphthalene-3-carboxylic acid-(2'-ethoxy)-phenylamide,
2-hydroxynaphthalene-3-carboxylic acid-(4'-methoxy)-phenylamide,
2-hydroxynaphthalene-3-carboxylic acid-(2'-methyl-4'-chloro)-phenylamide,
2-hydroxynaphthalene-3-carboxylic acid-(2'-methoxy-5'-chloro)-phenylamide.

Examples of representative dyestuffs are as follows:

Example 1

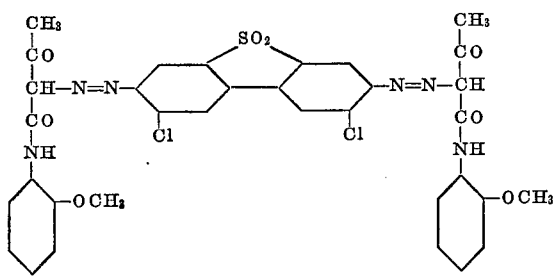
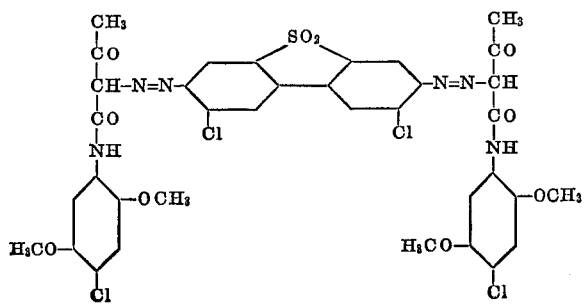

Example 2

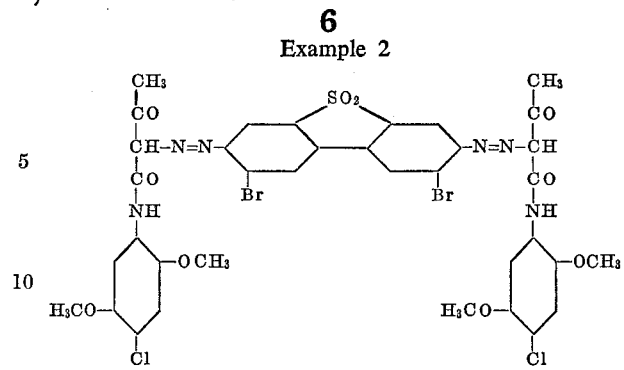

Example 3

Having thus disclosed the invention was we claim is:
1. Dye of the formula

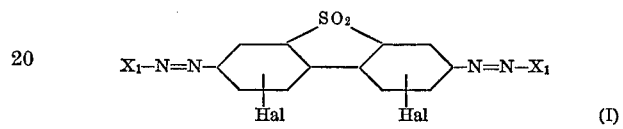

wherein each $X_1$ is

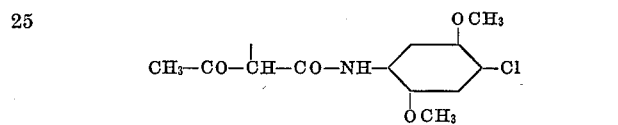

and each Hal is chloro or bromo.

2. The dyestuff according to claim 1 of the formula

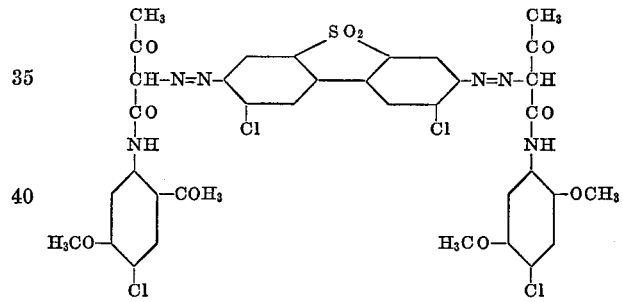

3. The dyestuff according to claim 1 of the formula

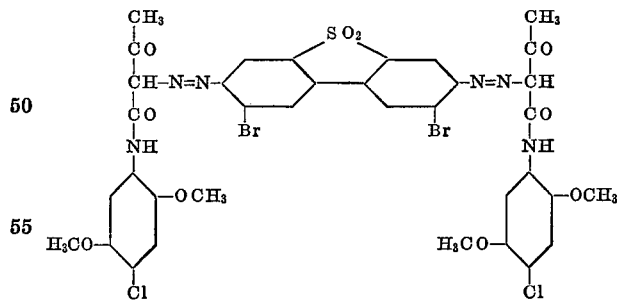

References Cited
UNITED STATES PATENTS 2,059,852  11/1936  Oahlen et al. _____ 260—176X
2,879,266   3/1959  Anderson _____ 260—152

CHARLES B. PARKER, Primary Examiner
D. M. PAPUGA, Assistant Examiner

U.S. Cl. X.R.
260—37, 160; 106—288; 117—139, 154

UNITED STATES PATENT OFFICE
CERTIFICATE OF CORRECTION

Patent No. 3,574,181              Dated April 6, 1971

Inventor(s) WILLY FORTER and FRITZ KEHRER

It is certified that error appears in the above-identified patent and that said Letters Patent are hereby corrected as shown below:

Column 1, in the heading immediately below line 6, insert: --C priority, application Switzerland, January 27, 1967, 1291/67--. Colum line 6, "diazo" should be --disazo--. Column 3, line 32, "carystalliz should be --crystallized--.

Signed and sealed this 2nd day of May 1972.

(SEAL)
Attest:

EDWARD M. FLETCHER, JR.          ROBERT GOTTSCHALK
Attesting Officer                 Commissioner of Patent